United States Patent
Ballard et al.

(10) Patent No.: US 9,610,837 B2
(45) Date of Patent: Apr. 4, 2017

(54) INTEGRATED FUEL TANK VENT AND SHUTOFF VALVE

(71) Applicant: Flomax International, Inc., Springville, UT (US)

(72) Inventors: Mark Paul Ballard, Pleasant Grove, UT (US); Carl Paul Ballard, Lindon, UT (US); John Trent Kendrick, Mapleton, UT (US)

(73) Assignee: Flomax International, Inc., Springville, UT (US)

( * ) Notice: Subject to any disclaimer, the term of this patent is extended or adjusted under 35 U.S.C. 154(b) by 0 days.

(21) Appl. No.: 14/675,444

(22) Filed: Mar. 31, 2015

(65) Prior Publication Data

US 2015/0274007 A1 Oct. 1, 2015

Related U.S. Application Data (60) Provisional application No. 61/972,935, filed on Mar. 31, 2014.

(51) Int. Cl.
*F16K 31/18* (2006.01)
*B60K 15/035* (2006.01)
*F16K 24/04* (2006.01)

(52) U.S. Cl.
CPC ........ *B60K 15/03519* (2013.01); *F16K 24/04* (2013.01); *Y10T 137/3099* (2015.04)

(58) Field of Classification Search
CPC . B60K 15/04; B60K 15/03519; F16K 24/044; F16K 31/18
USPC .................................. 137/588, 430; 141/212
See application file for complete search history.

(56) References Cited

U.S. PATENT DOCUMENTS

| | | | |
|---|---|---|---|
| 4,139,031 A | 2/1979 | Wood et al. | |
| 4,305,422 A * | 12/1981 | Bannink | F16K 1/305 137/415 |
| 4,416,301 A * | 11/1983 | Brumm | F16K 1/123 137/220 |

(Continued)

FOREIGN PATENT DOCUMENTS

WO 2014046709 A1 3/2014

OTHER PUBLICATIONS

PCT/US2015/023717, International Search Report and Written Opinion, Jul. 9, 2015.

*Primary Examiner* — Craig Schneider
*Assistant Examiner* — Angelisa L Hicks
(74) *Attorney, Agent, or Firm* — Kunzler Law Group (57) ABSTRACT

A vent and shutoff valve is provided, and includes an upper portion with an inlet for receiving fluid and an outlet for venting vapors. The upper portion mounts to an outer surface of a fuel tank. The lower portion extends into the fuel tank. The lower portion includes an elongated tubular valve housing, and a sliding sleeve housing disposed within the valve housing that defines a fluid pathway. The sliding sleeve housing includes a bypass port that fluidly couples the fluid pathway with a fluid channel formed between an outer surface of the sliding sleeve housing and an inner surface of the valve housing. The lower portion also includes a sliding sleeve disposed within the sliding sleeve housing that forms a fluid chamber between an outer surface of the sliding sleeve and an inner surface of the valve housing. The fluid chamber is fluidly coupled with the fluid channel.

14 Claims, 6 Drawing Sheets

(56) References Cited

U.S. PATENT DOCUMENTS

| | | | |
|---|---|---|---|
| 5,232,028 A * | 8/1993 | Sunderhaus | B67D 7/0288 |
| | | | 137/588 |
| 6,247,492 B1 | 6/2001 | Stuart | |
| 6,311,723 B1 | 11/2001 | Shipp et al. | |
| 6,679,396 B1 * | 1/2004 | Foltz | B60K 15/04 |
| | | | 141/301 |
| 7,967,025 B2 * | 6/2011 | Kidprasert | F16K 31/26 |
| | | | 137/410 |
| 2011/0108159 A1 | 5/2011 | Grote | |
| 2011/0226356 A1 * | 9/2011 | Yamaguchi | B60K 15/03519 |
| | | | 137/511 |

* cited by examiner

INTEGRATED FUEL TANK VENT AND SHUTOFF VALVE

CROSS-REFERENCES TO RELATED APPLICATIONS

This application claims the benefit of and claims priority to U.S. Provisional Patent Application No. 61/972,935 entitled "INTEGRATED FUEL TANK VENT AND SHUTOFF VALVE" and filed on Mar. 31, 2014 for Mark Paul Ballard et al., which is incorporated herein by reference.

FIELD

This disclosure relates to fluid transfer devices, and more particularly to a fluid receiver and fuel tank vent for receiving fluid from a nozzle.

BACKGROUND

Fuel receivers for receiving fuel from a fuel source are used for refueling large pieces of equipment, such as construction and mining vehicles, on-site using a mobile refueling source, such as a refueling truck. Generally, the fuel receivers are secured to the equipment in fluid communication with a fuel tank of the equipment. A fuel source includes a hose and a nozzle attached to an end of the hose. When fueling or refueling of the equipment is desired, the nozzle is placed securely over the receiver, a valve of the receiver is opened, and fuel is pumped from the fuel source, through the hose, nozzle, and receiver, to the fuel tank of the equipment. Such receiver and nozzle refueling systems are designed to facilitate efficient and rapid refueling events, that is, attachment of the nozzle, transmission of fuel into the fuel tank, and detachment of the nozzle.

Oftentimes, the fuel tank of large industrial equipment is very large, capable of holding hundreds of gallons of fuel. To efficiently fill such fuel tanks, transfer rates are in the range of 1 to 5 gallons per second. However, determining when to stop the fuel transfer rate so as to not overfill the tank is problematic. Current fuel receivers may take up to 3-5 seconds to stop the flow of fuel, at which time an extra 35 gallons may have flowed into the tank.

SUMMARY

An apparatus and system for a non-pressure valve and vent assembly is disclosed. In one embodiment, the apparatus includes an upper portion with an inlet for receiving fluid and an outlet for venting vapors. The upper portion mounts to an outer surface of a fuel tank. The lower portion extends into the fuel tank. The lower portion includes an elongated tubular valve housing, and a sliding sleeve housing disposed within the valve housing that defines a fluid pathway. The sliding sleeve housing includes a bypass port that fluidly couples the fluid pathway with a fluid channel formed between an outer surface of the sliding sleeve housing and an inner surface of the valve housing. The lower portion also includes a sliding sleeve disposed within the sliding sleeve housing that forms a fluid chamber between an outer surface of the sliding sleeve and an inner surface of the valve housing. The fluid chamber is fluidly coupled with the fluid channel.

In one embodiment, the apparatus also includes a spring to bias the sliding sleeve with reference to the sliding sleeve housing. An entry cone may be disposed in the sliding sleeve housing and configured to create a low pressure/high velocity fluid flow area. The apparatus also includes a contoured surface configured to engage the sliding sleeve and prevent a flow of fluid through the sliding sleeve housing in response to a fuel level in the non-pressurized fuel tank reaching a predetermined level.

In one embodiment, the apparatus includes a float tube disposed between the sliding sleeve housing and the upper portion and fluidly coupling the upper portion with the sliding sleeve housing. In a further embodiment, the apparatus includes a poppet disposed around the float tube and forms a void between the poppet and the float tube, where the void is fluidly coupled with the fluid channel. In another embodiment, the apparatus includes a bell housing disposed around the poppet and moveable from a first position that blocks a flow of fluid through the void to a second position that allows the flow of fluid through the void and into the non-pressurized fuel tank.

In another embodiment, the apparatus includes a float coupled with the bell housing and is disposed around the float tube. The apparatus may also include a coupling connector disposed between the upper portion and the tubular valve housing. At least one channel may fluidly couple an opening in the tubular valve housing with the outlet.

The system is also provided. In one embodiment, the system includes a non-pressurized fuel tank, and the apparatus described above.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved by currently available fuel receivers. Accordingly, the subject matter of the present application has been developed to provide a fluid receiver that overcomes at least some shortcomings of the prior art.

Described herein are various embodiments of a fueling system capable of automatic shutoff once a predetermined fuel level has been reached inside of a fuel tank. The fueling system, beneficially, reduces the risk of under filling and overfilling, and accordingly, reduces the likelihood of fuel spillage. The fuel system allows for rapid filling of non-pressurized fuel tanks by fluidly connecting a non-pressure fuel shutoff valve (hereinafter "non-pressure valve") and a non-pressure vent into a single, all-in-one ("AIO") fill valve.

The AIO valve is formed having a substantially annular flow path around a hydrodynamically optimized entry cone that allows for non-turbulent high fuel flow rates into the fuel tank. A portion of the fuel is diverted through bypass ports to a float tube connected with a bell and poppet, and into the fuel tank. A float attached with the bell detects when the fuel reaches a predetermined fill level and causes a change in the annular flow path between the bell and the poppet. Any change in the annular flow path results in the poppet forming a seal with the bell, and consequently, the backpressure in the hose causes the AIO valve to close, as will be described below in greater detail.

Figure 1:
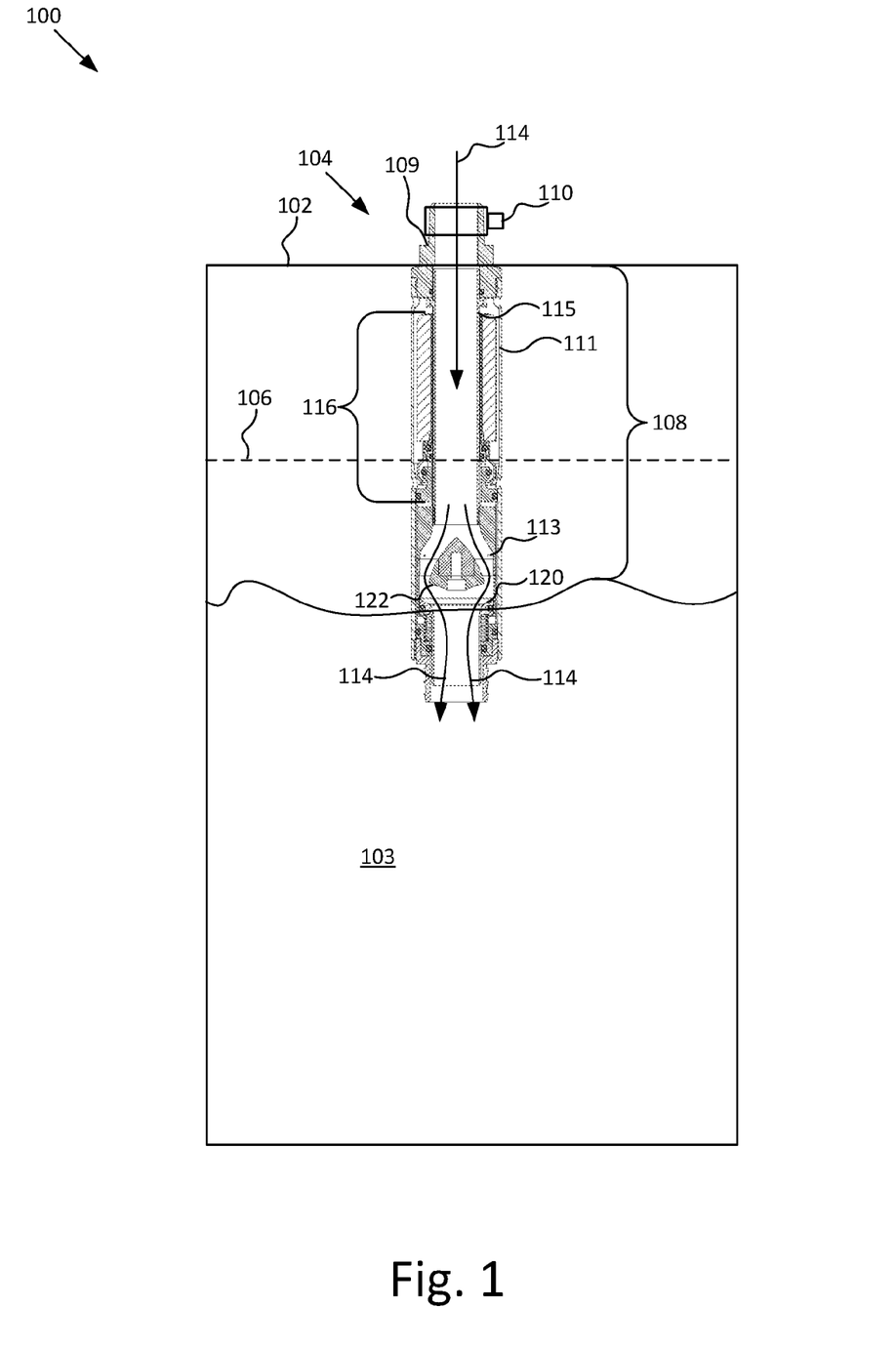
FIG. 1 is a schematic diagram illustrating one embodiment of a fuel system in accordance with embodiments of the invention.

FIG. 1 is a schematic diagram illustrating one embodiment of a fuel system 100 in accordance with embodiments of the invention. The fuel system 100, as depicted, includes a fuel tank 102 that receives fuel 103 through an AIO valve 104. Beneficially, the AIO valve 104, in one embodiment, is configured to function as a shut-off valve and a fuel receiver. The AIO valve 104 is configured to shutoff fuel flow when the fuel level reaches a predetermined fill level 106. The predetermined fill level 106 is selected according to the size of the fuel tank 102 (i.e., dimensions of the fuel tank 102). The unused area of the fuel tank 102 is known as "ullage." In other words, the area between the fuel and the top of the fuel tank is the ullage 108.

The ullage 108 is predetermined to allow the fuel 103 sufficient room to expand and contract without overfilling the fuel tank 102. Previously, the amount of ullage 108 required had to take into account the amount of time required to stop flow through a shutoff valve. Current shutoff valves may take up to 1-3 seconds to completely stop fuel flow, which, at high flow rates, may be equivalent to an extra 5-35 gallons of fuel. Beneficially, the described fuel system 100 is capable of substantially instantaneous shutoff of fuel flow. As such, a smaller ullage 108 is required, and more precise filling is accomplished.

A vent 110 allows for the breathing of the fuel tank 102. The vent 110 allows the air of the ullage 108 to escape the fuel tank 102 as fuel 103 fills the tank. The vent 110 is fluidly coupled via channels in a fuel receiver portion 109 with the valve housing 111. The channels will be discussed in greater detail below with reference to FIG. 5. While the components of the AIO valve 104 and the vent 110 will be described in greater detail below, the method of operation includes, briefly, diverting a portion of the fuel 103 through the bypass ports 113 and into a vent flow path disposed between an inner surface of the valve housing 111 and the internal components of the AIO valve 104. The direction of this diverted portion of fuel is depicted in FIG. 1 by arrows 114. The fuel flows 114 through a float tube 115 in the vent and into a float assembly 116. The float assembly 116 is housed within the valve housing 111 that extends into the fuel tank 102. The length of the valve housing 111 is determined by the desired fill level 106. Stated differently, a longer float assembly 116 results in a larger ullage 108 as compared to a shorter float assembly 116.

When the fuel 103 reaches the float assembly 116, and causes the float assembly 116 to move upward, the fuel flow through the AIO valve 104 is impeded and the fuel pressure in the AIO valve 104 increases. The increase pushes a sliding sleeve 120 that engages a surface 122 of the AIO valve and consequently stops the flow of fuel through the AIO valve 104.

As depicted, the AIO valve 104 is a single unit that is beneficially disposed within the tank 102 and does not require any external mounts or routing. As will be discussed below, the AIO valve 104 may be configured as one integral receiver unit for coupling with a fuel nozzle. The components of the AIO valve 104 are generally formed of rigid materials suitable for use in fuel environments. Examples of a rigid material suitable for use include, but are not limited to, aircraft grade aluminum that may be anodized, or nickel-plated steel. The components of the AIO valve 104, generally, have either circular or annular cross-sectional profiles. Alternatively, other geometric profiles are contemplated, including but not limited to, rectangular, hexagonal, etc.

Figure 2:
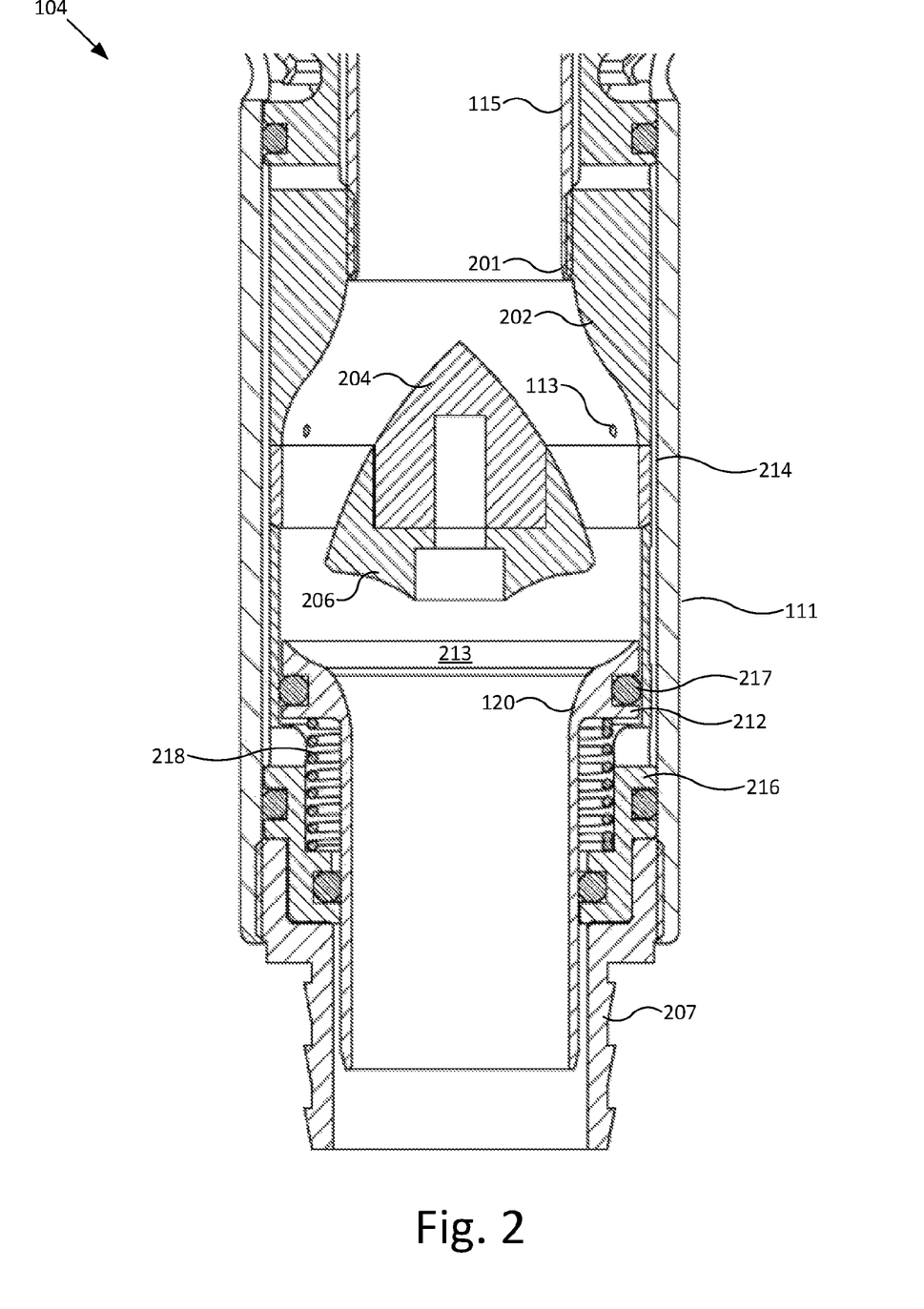
FIGS. 2 and 3 are longitudinal cross-sectional view diagrams illustrating embodiments of the sliding sleeve in accordance with embodiments of the invention.
Figure 3:
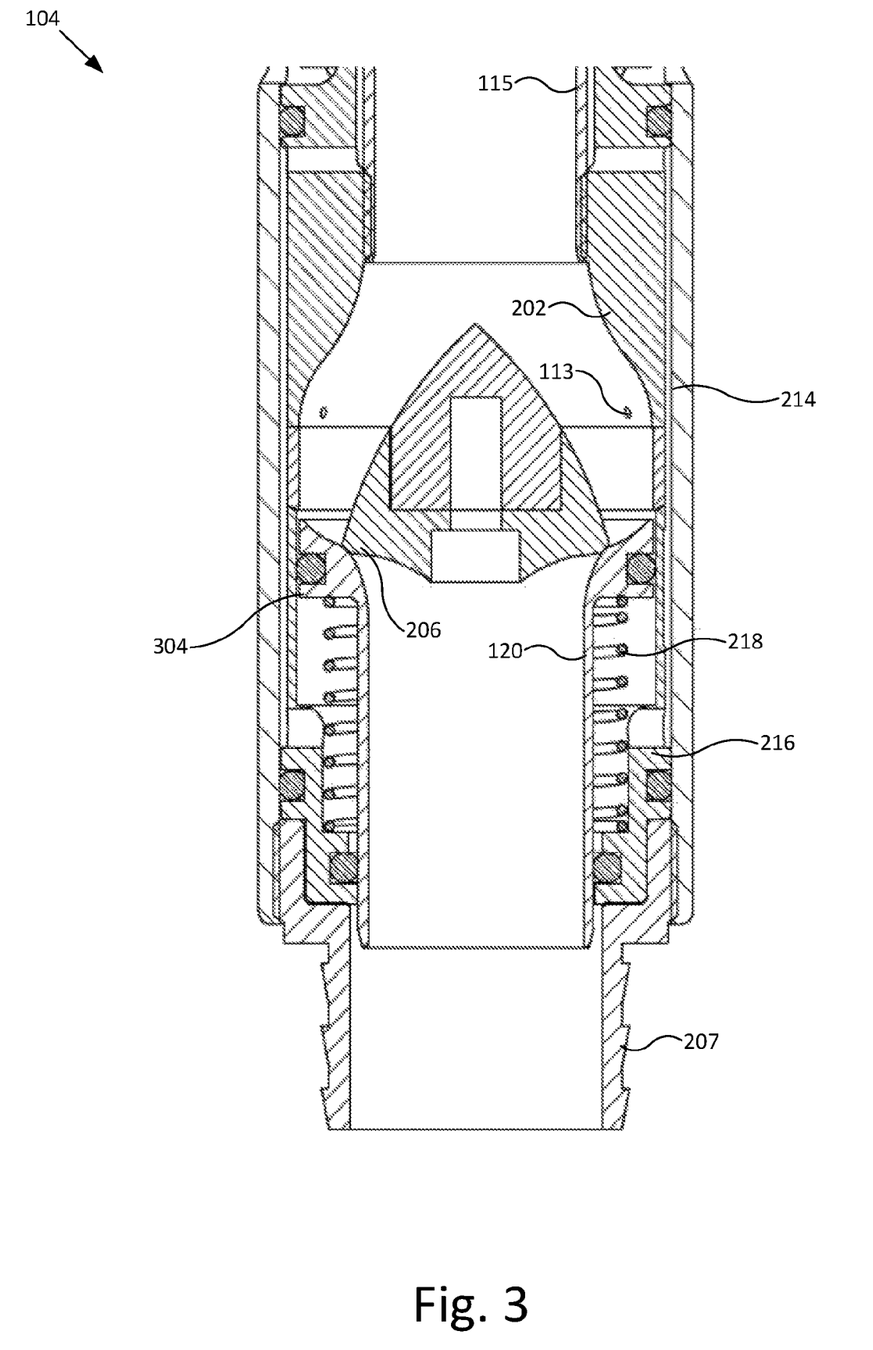

FIGS. 2 and 3 are longitudinal cross-sectional view diagrams illustrating embodiments of the sliding sleeve 120 in accordance with embodiments of the invention. The sliding sleeve 120, as described, is configured to slide between an open position (see FIG. 2) and a closed position (see FIG. 3). In the closed position the sliding sleeve 120 engages a bulb 206 (i.e., a contoured surface that engages the sliding sleeve 120, which may be shaped in a manner similar to a bulb). The sliding sleeve 120 is formed with an exterior diameter selected to slidingly mate with an interior surface of an outlet 207. A shoulder 212 formed in the sliding sleeve 210 abuts a corresponding cutout portion in the sliding sleeve housing 202 when the sliding sleeve 210 is in an open position. As used herein, the phrase "open position" refers to an operating mode wherein fuel is allowed to flow. Similarly, the phrase "closed position" refers to an operating mode wherein the flow of fuel is impeded.

The bulb 206 is disposed adjacent to an entry cone 204 and disposed within the sliding sleeve housing 202. The flow path through the sliding sleeve housing 202 with the entry cone 204 and the bulb 206 is annular, with the entry cone 204 and the bulb 206 forming a venturi. As used herein, the term "venturi" refers to an area having a smaller diameter flow path as compared to an adjacent but upstream area that causes the fluid flow velocity to increase and the pressure to decrease.

The entry cone 204 is hydrodynamically optimized to reduce undue fluid drag. The entry cone 204 may have a cross-sectional profile resembling a pointed elliptical cone, as depicted. Other hydrodynamically optimized cross-sections are contemplated, including but not limited to, simple pointed cones, parabolic cones, spherically blunted ogive cones, bi-conic cones, etc. In other words, any cross-sectional profile of the entry cone 204 that reduces fluid drag, and does not introduce turbulence, may be implemented in the sliding sleeve housing 202.

The change in the flow path diameter causes fuel to flow through the bypass ports 113 in the sliding sleeve housing 202. An inlet 213 of the sliding sleeve 120 may have a decreasing cross-sectional diameter as depicted. O-rings 217 may be embedded in the outer surface of the sliding sleeve 120 to form a seal between the housing 202 and the sliding sleeve 120. Other O-rings, as depicted, may be used to form seals wherever deemed appropriate.

The diameter of the sliding sleeve housing 202 is selected to form a channel 214 between an outer surface of the sliding sleeve housing 202 and an inner surface of the valve housing 111. The bypass ports 113 fluidly couple the inside of the sliding sleeve housing 202 with the exterior of the sliding sleeve housing 202. In other words, the bypass ports 113 allow fuel to flow through the sliding sleeve housing 202.

As will be described below in greater detail, while the fuel level is below a predetermined level, a portion of the fuel flows through the bypass ports 113 and into the channel 214. The portion of the fuel fills the channel 214 that extends upward from the support 216 to the bell housing. The fuel flows upward through a bell housing and exits through an opening and into the fuel tank. However, when the fuel level in the tank reaches a certain level where the float assembly begins to move, fuel through the bell housing is impeded. Pressure builds in the channel 214, and helps the spring 218 overcome the pressure of the incoming fuel. The fuel pushes on the shoulder 304 (see FIG. 3) of the sliding sleeve 120 and causes the sliding sleeve 120 to move to the closed position and engage the bulb 206.

The spring 218 is disposed between the sliding sleeve 120 and the support 216. The spring 218, as depicted, is a compression or helical spring and is configured with a spring rate in the range of between about 0.5 and 25 psi. The spring rate of the spring 218 is selected to allow the flow of fuel from the float tube 115 to flow substantially unimpeded into the fuel tank. As backpressure at an inlet of the AIO valve 104 causes a fuel nozzle to shut off, the sliding sleeve 120 is configured to slide from a default closed position to the open position with little force. As will be described in greater detail below, backpressure from fuel flow through the channel 214 pushes on the shoulder 212 and moves the sliding sleeve 120 from the open position to the closed position, thereby increasing the backpressure on the fuel nozzle and stopping fuel flow.

Figure 4:
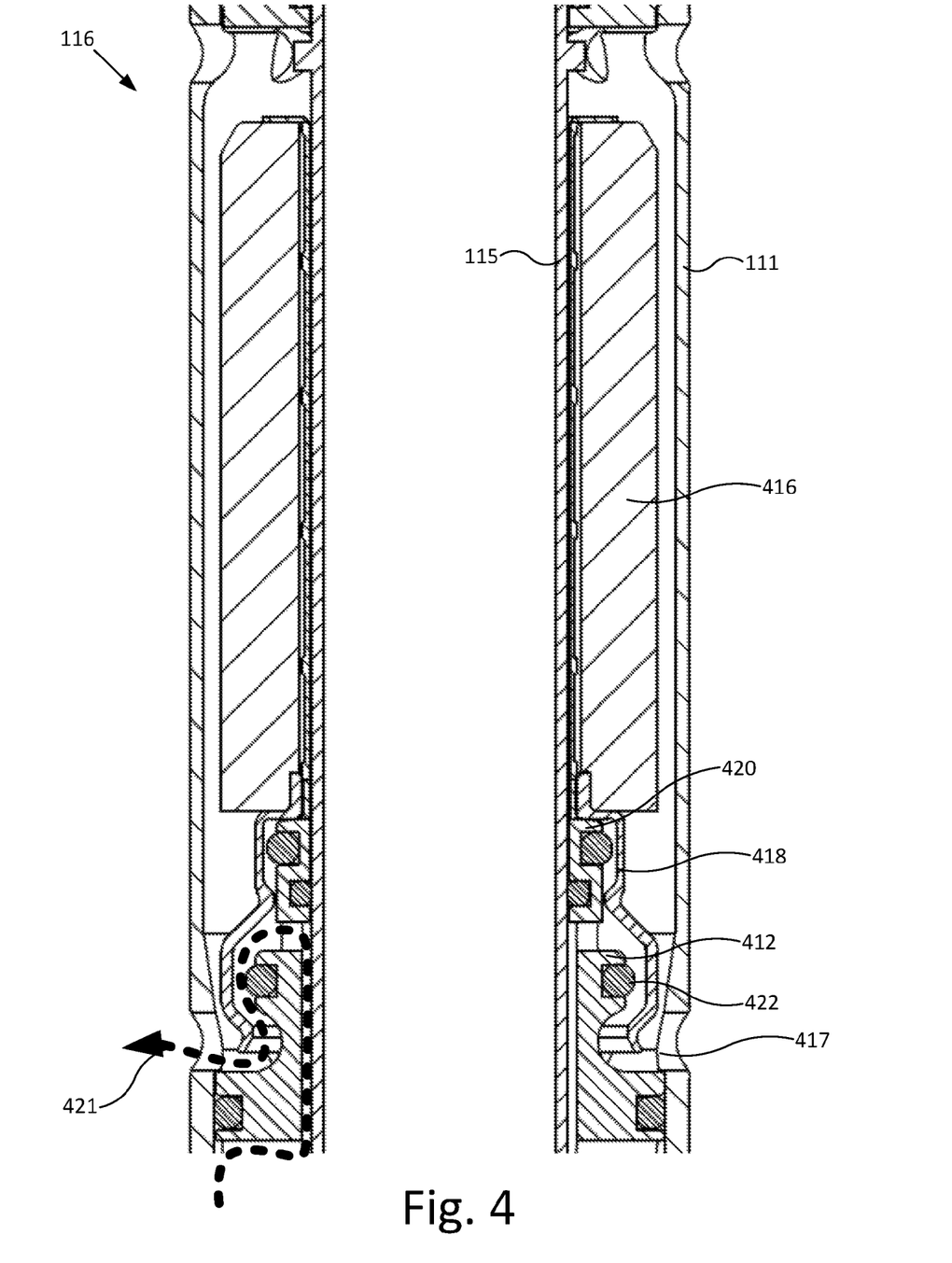
FIGS. 4 and 5 are side cross-sectional diagrams illustrating a portion of the AIO valve, and in particular, the float assembly in an open position (see FIG. 4) and in a closed position (see FIG. 5)
Figure 5:
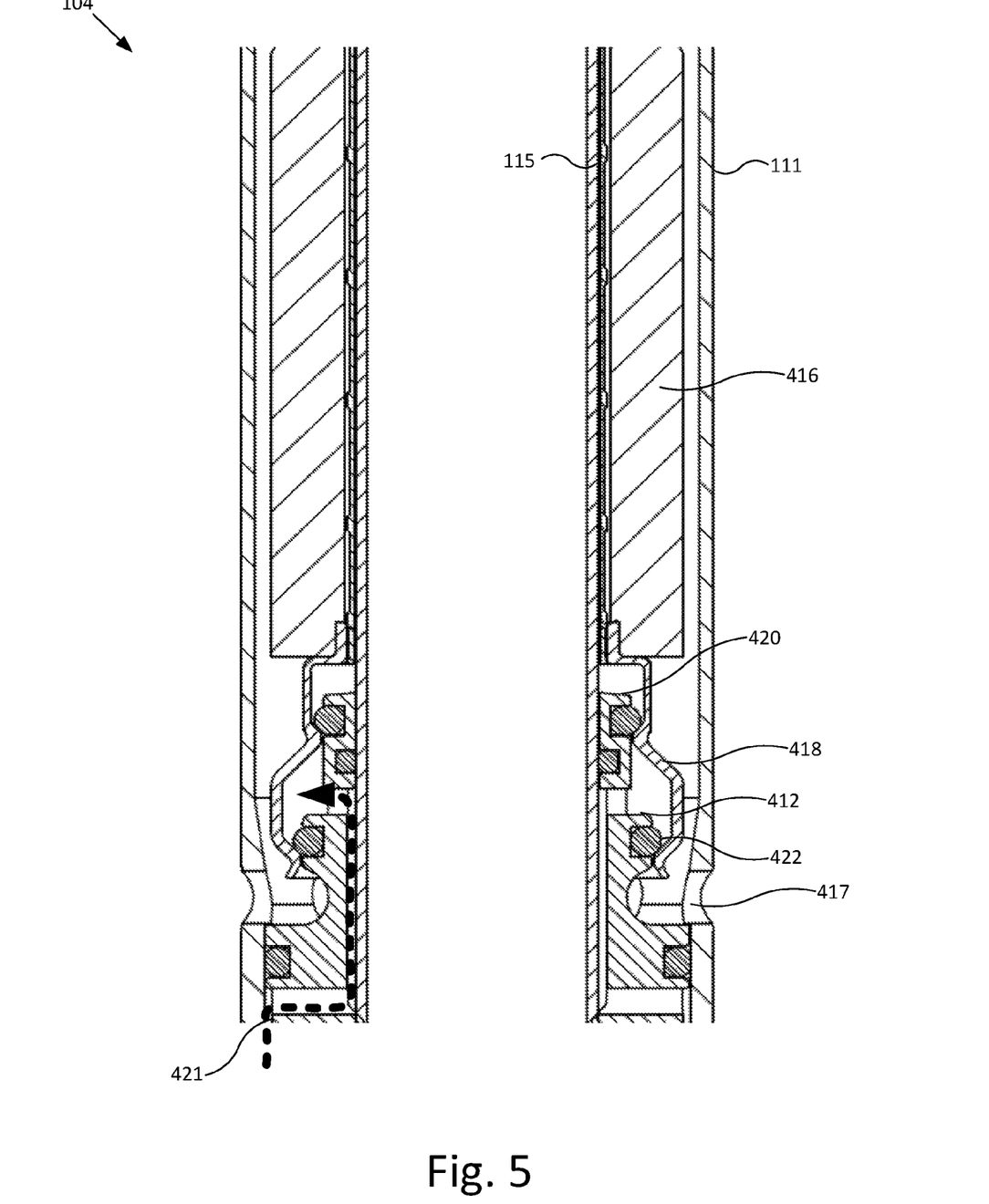

FIGS. 4 and 5 are side cross-sectional diagrams illustrating a portion of the AIO valve 104, and in particular, the float assembly 116 in an open position (see FIG. 4) and in a closed position (see FIG. 5). Disposed within the valve housing 111 is the float tube 115. The float tube 115 is a tubular pipe with a first end fluidly coupled with a fuel dispenser (not shown), and a second end fluidly coupled with sliding sleeve housing 202.

The float tube 115 slidably engages the float assembly 116. In one embodiment, the float assembly 116 includes a float 416 and a bell housing 418 coupled to one end of the float 416. The float assembly 116 is configured to move freely with respect to the float tube 115. In a default, or "open position" as depicted in FIG. 4a, the float assembly 116 rests on a bell guide 420. Fuel flows into the area, from the channel 214, between the bell housing 418 and a poppet 412, and then back into the tank via openings 417 in the valve housing 111, as illustrated by arrow 421.

The poppet 412, in one embodiment, is formed with O-rings 422 for forming a seal between the poppet 412 and the bell housing 418 when in "closed position" (see FIG. 5). The void, or space between the poppet 412 and the bell housing 418 is dimensioned to allow the free flow of fuel from the channel 214. In one embodiment, the fuel flow rate in the channel is in the range of between about 1 and 3 gallons per minute, when the distance between the poppet 412 and the bell housing 418, at the narrowest point, is in the range of between about 0.05 and 0.5 inches and the diameter of the poppet 412 is in the range of between about 0.5 and 2 inches.

Once the fuel in the fuel tank rises to a level where the float 416 begins to rise, the distance between the widest portion of the poppet 412 and the bell housing 418 begins to narrow. Accordingly, the fuel flow begins to be impeded, and the pressure of the fuel begins to increase and push upward on the bell housing 418. Almost instantaneously, the bell housing 418 transitions to the closed position depicted in FIG. 5, and fuel flowing through the float tube 115 is stopped.

As described above, the backpressure that results is communicated with the sliding sleeve 120 described above with reference to FIGS. 2 and 3, and the AIO valve shuts off the fuel flow. In particular, the backpressure in the channel 214 causes fuel pressure to build in a void disposed between the support 216 and the shoulder 304 of the sliding sleeve 120. The fuel pressure, in one embodiment, begins to push on the shoulder 304 of the sliding sleeve 120. The fuel pressure, together with the spring, is sufficient to overcome the pressure of fuel from the fuel nozzle, and the sliding sleeve 120 seals the interior channel of the float tube to stop the flow of fuel.

Figure 6:
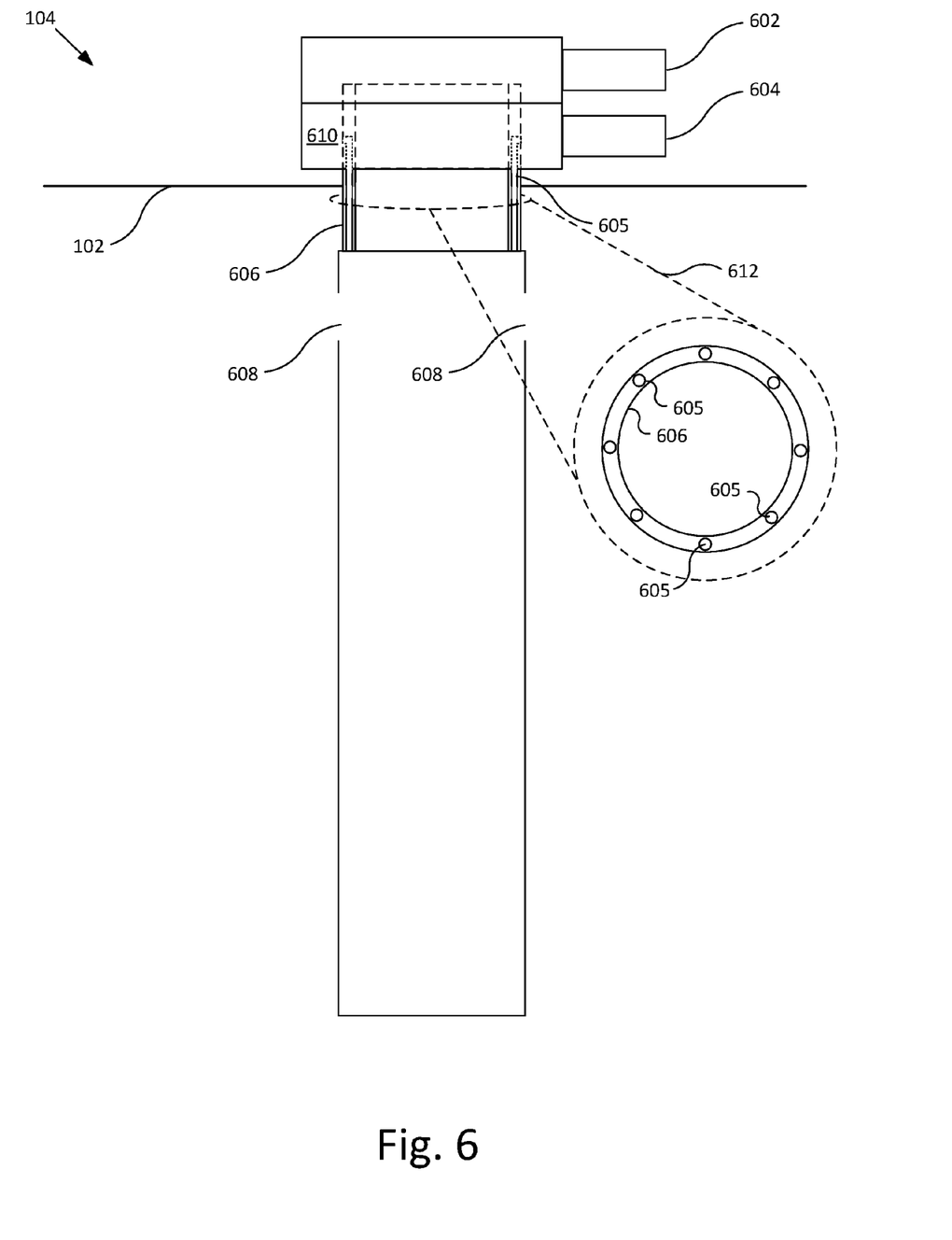
FIG. 6 is a schematic block diagram illustrating one embodiment of the AIO valve in accordance with embodiments of the invention.

FIG. 6 is a schematic block diagram illustrating one embodiment of the AIO valve 104 in accordance with embodiments of the invention. The AIO valve 104, as described above is configured for receiving a fuel nozzle (not shown) for filling the tank 102 via an inlet 602. Although the inlet 602 is depicted as filling from the side, it is contemplated that the inlet 602 may introduce fuel into the AIO valve in any direction desired due to the configuration of the vehicle or tank being filled. The AIO valve 104 is also configured with a vent 604.

The inlet 602 and the vent 604 may be rotatably coupled so that the inlet 602 may be independently turned in any direction with reference to the vent 604, and vice versa. As described above, the vent 604 allows for the escape of air/vapors in the ullage area as fuel occupies the ullage area. The vent is fluidly coupled with the valve housing 111 via channels 605 in a coupling connector 606. The coupling connector 606 may be a tubular section having interior and exterior threads (not shown for clarity). The threads allow the valve housing 111 to couple to the vent 604 and inlet 602.

The channels 605, in one embodiment, fluidly couple openings 608 in the valve housing 111 with the vent 604. The channels 605 are radially positioned in the coupling 606 and extend longitudinally from within the valve housing 111 to a position that allows the venting air to exit within a chamber 610 in the vent 604. Callout 612 depicts a lateral cross-section of the coupling 606. As depicted, the channels 605 may be formed in the coupling 606 and disposed between an interior surface (having an inside diameter) and an exterior surface (having an outside diameter). The channels 605, in one embodiment, extend longitudinally to a point within the chamber 610 of the vent 604, at which point outlets (not depicted) may fluidly couple the channels 605 with the vent 604.

The benefits of the above described embodiments are numerous, and include using only a single port at the top of the tank to fill and vent. Fuel enters in through the center of the unit then actuates the sliding sleeve, allowing the fill to proceed. Backpressure caused by the sliding sleeve forces fluid to bleed through the side porting (bypass ports) which connects to the aft of the sliding sleeve and the float assembly chamber. When the fluid reaches the correct level, determined by the float height, the float rises and seals of the float chamber from venting fluid. Pressure in the system keeps the float sealed and returns the sliding sleeve to the closed position. The system will remain closed until pressure is removed and the float is able to return to its static position. Additionally, the bottom of AIO valve allows for attachment of a hose to run to the bottom of the tank to remove freefall of fuel. Also, the above described embodiments do not require an external bleed line to run between a fill unit and a vent unit Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated fuel vent and receiver comprising:
   an upper portion comprising an inlet for receiving fuel and an outlet for venting vapors from an ullage, where the upper portion is configured to mount to an outer surface of a non-pressurized fuel tank; and
   a lower portion coupled with the upper portion and configured to extend into the non-pressurized fuel tank, where the lower portion comprises:
   an elongated tubular valve housing,
   a sliding sleeve housing disposed within the valve housing and defining a fluid pathway, the sliding sleeve housing comprising a bypass port fluidly coupling the fluid pathway with a fluid channel formed between an outer surface of the sliding sleeve housing and an inner surface of the valve housing,
   a sliding sleeve disposed within the sliding sleeve housing and forming a fluid chamber between an outer surface of the sliding sleeve and an inner surface of one of the sliding sleeve housing or the valve housing, where the fluid chamber is fluidly coupled with the fluid channel,
   a float tube disposed between the sliding sleeve housing and the upper portion and fluidly coupling the upper portion with the sliding sleeve housing, where the float tube includes a poppet disposed around the float tube to form a void between the poppet and the float tube, where the void is fluidly coupled with the fluid channel, and
   a bell housing disposed around the poppet and moveable from a first position that blocks a flow of fluid through the void to a second position that allows the flow of fluid through the void and into the non-pressurized fuel tank.

2. The integrated fuel vent and receiver of claim 1 further comprising a spring to bias the sliding sleeve with reference to the sliding sleeve housing.

3. The integrated fuel vent and receiver of claim 1, further comprising an entry cone disposed in the sliding sleeve housing and configured to create a low pressure/high velocity fluid flow area.

4. The integrated fuel vent and receiver of claim 3, further comprising a contoured surface configured to engage the sliding sleeve and prevent a flow of fluid through the sliding sleeve housing in response to a fuel level in the non-pressurized fuel tank reaching a predetermined level.

5. The integrated fuel vent and receiver of claim 1, further comprising a float coupled with the bell housing and disposed around the float tube.

6. The integrated fuel vent and receiver of claim 1, further comprising a coupling connector disposed between the upper portion and the tubular valve housing.

7. The integrated fuel and vent receiver of claim 6, further comprising at least one channel fluidly coupling an opening in the tubular valve housing with the outlet.

8. A fueling system comprising:
   a non-pressurized fuel tank;
   an integrated fuel vent and receiver comprising an upper portion and a lower portion, where the upper portion comprises an inlet for receiving fuel and an outlet for venting vapors from an ullage, and where the upper portion is configured to mount to an outer surface of the non-pressurized fuel tank; and
   where the lower portion couples with the upper portion and is configured to extend into the non-pressurized fuel tank, where the lower portion comprises:
   an elongated tubular valve housing,
   a sliding sleeve housing disposed within the valve housing and defining a fluid pathway, the sliding sleeve housing comprising a bypass port fluidly coupling the fluid pathway with a fluid channel formed between an outer surface of the sliding sleeve housing and an inner surface of the valve housing, a sliding sleeve disposed within the sliding sleeve housing and forming a fluid chamber between an outer surface of the sliding sleeve and an inner surface of one of the sliding sleeve housing or the valve housing, where the fluid chamber is fluidly coupled with the fluid channel, a float tube disposed between the sliding sleeve housing and the upper portion and fluidly coupling the upper portion with the sliding sleeve housing, where the float tube includes a poppet disposed around the float tube to form a void between the poppet and the float tube, where the void is fluidly coupled with the fluid channel, and a bell housing disposed around the poppet and moveable from a first position that blocks a flow of fluid through the void to a second position that allows the flow of fluid through the void and into the non-pressurized fuel tank.

9. The fueling system of claim 8, further comprising a spring to bias the sliding sleeve with reference to the sliding sleeve housing.

10. The fueling system of claim 8, further comprising an entry cone disposed in the sliding sleeve housing and configured to create a low pressure/high velocity fluid flow area.

11. The fueling system of claim 10, further comprising a contoured surface configured to engage the sliding sleeve and prevent a flow of fluid through the sliding sleeve housing in response to a fuel level in the non-pressurized fuel tank reaching a predetermined level.

12. The fueling system of claim 8, further comprising a float coupled with the bell housing and disposed around the float tube.

13. The fueling system of claim 8, further comprising:
a coupling connector disposed between the upper portion and the tubular valve housing; and
at least one channel fluidly coupling an opening in the tubular valve housing with the outlet.

14. A system comprising:
a non-pressurized fuel tank;
an integrated fuel vent and shutoff valve comprising:
an upper portion mounted to an outer surface of the non-pressurized fuel tank;
a lower portion coupled with the upper portion and extending into the non-pressurized fuel tank;
a float tube fluidly coupling the upper portion with the lower portion; and
a float assembly slidably coupled with the float tube and comprising a float and a bell housing configured to detect a fuel level in the non-pressurized fuel tank, where the bell housing is disposed around a poppet to form a void between the bell housing and the poppet, and where the bell housing is moveable from a first position that blocks the flow of fluid through the void to a second position that allows the flow of fluid through the void and into the non-pressurized fuel tank;
a sliding sleeve housing coupled with an outlet of the float tube, the sliding sleeve comprising at least one bypass port fluidly coupling the sliding sleeve housing with the float assembly; and
a sliding sleeve slidably coupled with the sliding sleeve housing, and coupled with a support.

* * * * *